Figure 1:
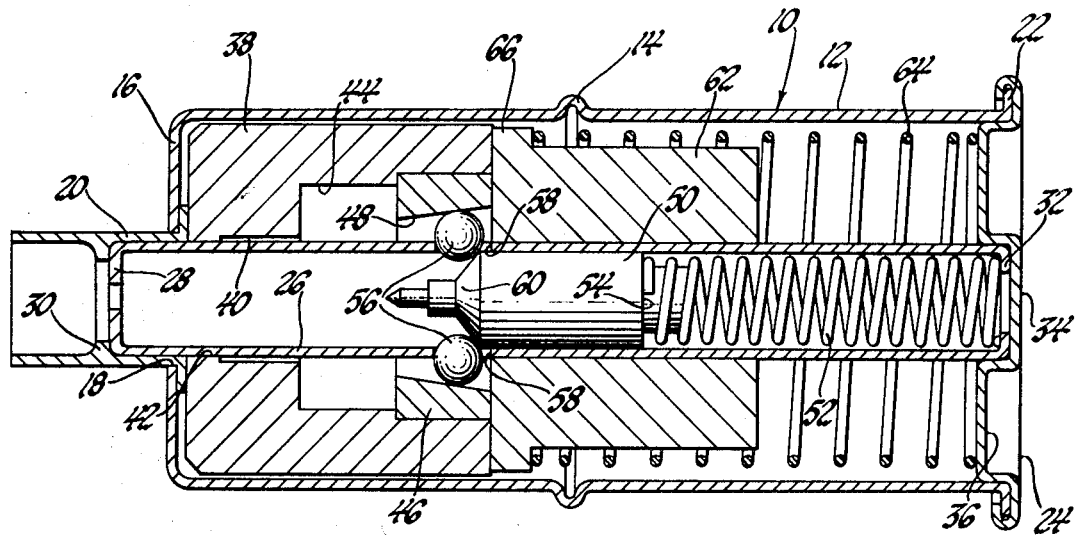

United States Patent

[11] 3,610,199

[72] Inventor Otakar P. Prachar
    Santa Barbara, Calif.
[21] Appl. No. 32,834
[22] Filed Apr. 29, 1970
[45] Patented Oct. 5, 1971
[73] Assignee General Motors Corporation
    Detroit, Mich.

[54] UNIDIRECTIONAL SENSOR
    4 Claims, 2 Drawing Figs.
[52] U.S. Cl. ............................................. 116/114 AH,
    73/514
[51] Int. Cl. ..................................................... G01p 15/00
[50] Field of Search ............................................. 73/492,
    514; 116/114.29; 200/61.45, 53; 280/150 AB

[56] References Cited
    UNITED STATES PATENTS
    2,585,749  2/1952  DiLorenzo et al. ............  200/61.53
    2,649,311  8/1953  Hetrick .........................  280/150

Primary Examiner—Richard C. Queisser
Assistant Examiner—Herbert Goldstein
Attorneys—W. E. Finken and Herbert Furman ABSTRACT: A unidirectional sensor which includes an operator mounted within a tubular guide for movement to an actuated position under a resilient bias. Primary and secondary seismic mass members surround the guide for movement axially thereat. A spring engages the secondary member to bias the secondary member into engagement with the primary member and hold the primary member in engagement with a stop to fix the weight members in a predetermined axial position. A plurality of balls are freely received within respective apertures in the guide and engage a radially tapered annular shoulder of the operator and an axially tapered internal annular wall of the primary member. Upon the application of an acceleration pulse of predetermined amplitude for a predetermined time to both weight members, the weight members move axially as the annular tapered wall forces the balls inwardly of the guide and along the operator shoulder until the balls pass through the narrower opening of the wall and release the operator for movement to actuated position. At lesser amplitude pulses, but above a minimum amplitude pulse, the secondary member moves axially of the guide while the primary member will remain stationary or move slightly axially of the balls and guide. Upon the cessation of the pulses of lesser amplitude, the secondary member moves in an opposite axial direction to impact the primary member and ensure its return to the predetermined axial position if it has moved.

PATENTED OCT 5 1971

3,610,199

INVENTOR.
Otakar P. Prachar
BY
Herbert Furman
ATTORNEY

UNIDIRECTIONAL SENSOR

This invention relates to sensors and more particularly to a unidirectional sensor for sensing acceleration pulses in a horizontal plane and releasing an operator, such as a firing pin, when the pulse reaches a predetermined amplitude for a predetermined time.

One of the features of the sensor of this invention is that it includes a pair of axially movable seismic mass members, one of which controls the release of the operator upon movement of the one mass member from a predetermined axial position through a predetermined axial distance, upon the application of a predetermined amplitude acceleration pulse for a predetermined time, and the other of which impacts the one member upon the application of a range of lesser amplitude pulses and returns the one member to its predetermined axial position upon the cessation of such lesser amplitude pulses if the one member has moved. Another feature is that the one mass member controlling the release of the operator includes an axially tapered annular wall constraining the radially outward movement of a plurality of balls with respect to an annular shoulder of the operator to hold the operator against movement under a resilient bias. A further feature is that the other mass member is resiliently biased into engagement with the one mass member to locate the one mass member in the predetermined axial position and restrain the other mass member against movement below a predetermined minimum amplitude acceleration pulse.

Figure 2:
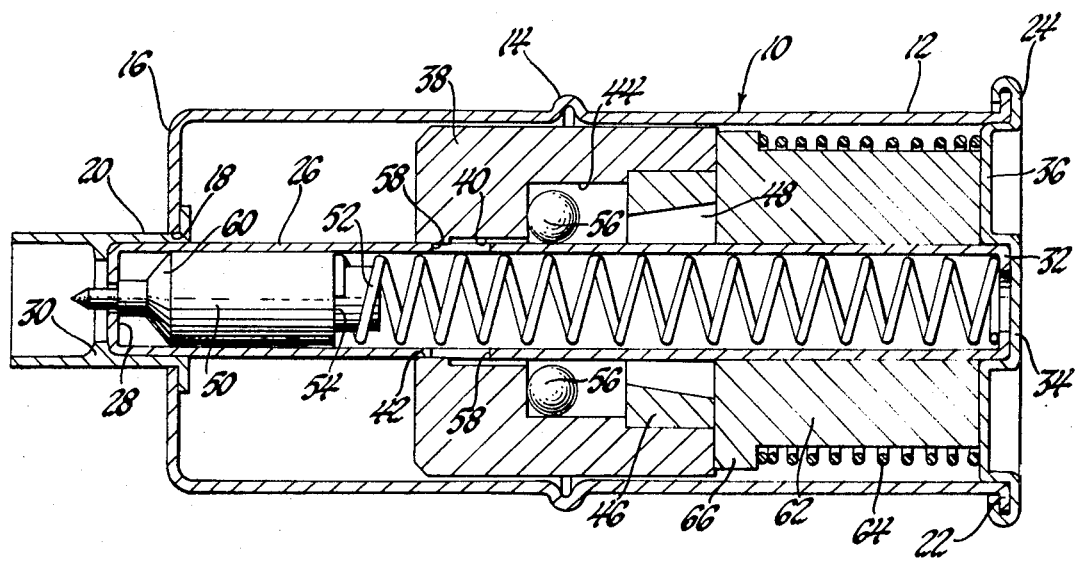

These and other features of the sensor of this invention will be readily apparent from the following specification and drawings wherein:

FIG. 1 is a longitudinal sectional view of the sensor in unactuated position; and FIG. 2 is a view of the sensor in actuated position.

Referring now particularly to the drawings, a sensor 10 according to this invention includes a cylindrical casing 12 having an annular integral rib 14. One end wall 16 of the casing 12 includes a central aperture 18. A flanged bushing 20 extends outwardly through the aperture 18 and has its flange suitably secured to the wall 16. The casing 12 further includes a radially outwardly extending flange 22 at the other end thereof and a cap or closure 24 is hem flanged to the flange 22. If desired, the closure 24 may be releasably secured in a suitable manner to the flange 22 such as by a bayonet-slot construction.

A cylindrical axial guide 26 has one apertured end wall 28 thereof received within the bushing 20 in engagement with an internal annular rib 30 of the bushing and the other apertured end wall 32 thereof received within a central cylindrical boss 34 of the cap 24 which is defined by an annular rib 36 of the cap.

A seismic mass 38 includes an internal annular bore 40 of greater diameter than the OD of the guide 26. A radially inwardly extending annular rib 42 at one end of bore 40 slidably engages the guide 26 and the other end of the bore 40 opens to an annular bore 44 of stepped construction. An annular ring 46 fits within the largest diameter portion of bore 44 and includes an axially tapered internal annular wall 48. An operator 50 is slidably mounted within the guide 26. A coil compression spring 52 seats against an annular wall 54 of the operator and the end wall 32 of the guide 26 to continually bias the operator 50 to the left. A plurality of balls 56 are freely received within respective circumferentially spaced openings 58 in the wall of the guide 26 and tangentially engage both wall 48 and a radially outwardly tapered annular shoulder 60 of the operator to constrain the operator 50 against movement to the left under the action of the spring 52. The wedging action of balls 56 on wall 48 likewise holds the seismic mass 38 against movement to the right to maintain the mass in engagement with the flange of the bushing 20 and thereby locate the mass 38 in the predetermined axial position shown in FIG. 1. A second seismic mass 62 is slidably mounted on the guide 26. A coil compression spring 64 of lighter force than the spring 52 seats on the rib 36 and on a flange 66 of the mass 62 to continually bias the mass 62 to the left and into engagement with the mass 38 and in turn hold the mass 38 in engagement with the flange of the bushing 20.

When an acceleration pulse equal to or greater than a predetermined amplitude for a predetermined time is applied to the masses 38 and 62 in the required axial direction, the masses will move to the right from their FIG. 1 position to their FIG. 2 position to release the balls 56 as will now be described. As the masses move to the right, the wall 48 forces the balls 56 radially inwardly of the shoulder 60 until the tangential distance between the points of engagement of any two balls with wall 48 equals the diameter of the narrower opening of wall 48. Thereupon the shoulder 60 under the action of spring 52 will force the balls 56 outwardly into the groove defined by the smaller diameter portion of bore 44 and an end wall of the ring 46, as shown in FIG. 2, to release the operator 50 for movement to the left.

If the acceleration pulses are of lesser amplitude but above a predetermined minimum amplitude, the seismic mass 62 will still move to the right against the action of the spring 64. However, the axial distance of movement could be less than that shown in FIG. 2. The spring 64 in the specific embodiment shown requires a pulse of at least 2G for 8 ms. before any movement of the mass 62 can occur. The mass 38 will either remain stationary or move slightly to the right upon the occurrence of such lesser amplitude acceleration pulses. If any movement of the mass 38 does occur, it will not be sufficient to release the balls 56. Upon cessation of such lesser amplitude pulses, the mass 62 will immediately return to the left under the action of the spring 64 and impact the mass 38. If any movement of the mass 38 has occurred, the impact of the mass 62 will return the mass 38 to its predetermined axial position as shown in FIG. 1. Likewise if any movement of the mass 38 has occurred and it will not normally return to its position shown in FIG. 1 due to the wedging action of the balls 56 on wall 48, the impact of the mass 62 will overcome such wedging action.

It is believed likewise clear that even if an acceleration pulse equal to or greater than the predetermined amplitude does occur but the time interval is below the predetermined time interval, the balls 56 will not be released since the mass 38 will not move through the required axial distance.

The primary and secondary masses 38 and 62 may be of the same or of different weight. However, it is important that the natural frequency of the primary spring-mass system be higher than that of the secondary spring-mass system. The function of the secondary spring-mass system is to transmit impulse to the primary spring-mass system and ensure return of the primary mass 38 to its predetermined axial position shown in FIG. 1, in the event that the acceleration pulse is of lesser amplitude than the amplitude of the predetermined pulse.

Likewise, the ratio of the restoring force on the primary mass 38, which is due to the reaction of the balls 56 on surface 48, to the restoring force on the secondary mass, which is due to spring 64, must be greater than the ratio of the weights of the respective masses.

The masses 38 and 62 will ordinarily not move as a unit when subjected to acceleration pulses above the minimum amplitude since the secondary spring-mass system will clearly move faster or at a greater rate to the right as viewed in FIGS. 1 and 2, and reach its limit position shown in FIG. 2 before the primary mass 38 reaches its position shown in this figure.

The sensor 10 is specifically intended for use in a vehicle air cushion restraint system. Such a system may include a fluid-filled pressure vessel sealed by a rupturable diaphragm, an inflatable bag or cushion and a manifold connecting the vessel and the cushion. The firing pin of the operator may directly rupture the diaphragm or actuate a detonator to rupture the diaphragm. Alternatively, the pin or the operator 50 may initiate rupture of the diaphragm by closing a switch to electrically fire a squib or detonator which ruptures the diaphragm. Rupture of the diaphragm releases the contents of the pressure vessel and inflates the cushion when the vehicle is subjected to conditions which apply an acceleration pulse of predetermined amplitude and time to the seismic mass. The sensor may be used equally as well with pure pyrotechnic or combination fluid and pyrotechnic systems to electrically fire a squib in the vessel and in turn fire the pyrotechnic material.

Thus, this invention provides an improved sensor.

What is claimed is:

1. A unidirectional sensor comprising, in combination, a support, a generally axial guide mounted on the support, primary and secondary annular seismic mass members axially movable relative to the guide, means exerting a predetermined axial bias on the secondary mass member, cooperating stop means on the primary mass member and support engageable with each other under the bias to locate the weight members in engagement with each other and in a predetermined axial position with respect to the guide, an operator slidably supported on the guide for axial movement relative thereto, resilient means biasing the operator axially of the guide, means releasably engageable with the primary mass member and operator to block axial movement of the operator and resist movement of the primary mass member from the predetermined axial position, the application of an acceleration pulse of predetermined amplitude and time to the primary mass members moving the primary mass member through a predetermined axial distance to release the engageable means from both the primary mass member and operator and release the operator for axial movement relative to the guide, the application of lesser amplitude pulses moving the secondary mass member against the predetermined bias thereon independently of any movement of the primary mass member relative to the engageable means, the secondary mass member impacting the primary mass member upon cessation of such lesser amplitude pulses to ensure return of the primary mass member to the predetermined axial position should any movement of the primary mass member relative to the engageable means occur.

2. A unidirectional sensor comprising, in combination, a support, a generally axial guide mounted on the support, primary and secondary annular seismic mass members axially movable relative to the guide, means exerting a predetermined axial bias on the secondary mass member, cooperating stop means on the primary mass member and support engageable with each other under the bias to locate the weight members in engagement with each other and in a predetermined axial position with respect to the guide, an operator slidably supported on the guide for axial movement relative thereto, resilient means biasing the operator axially of the guide, means wedgingly engageable with axially and radially directed juxtaposed surfaces of the primary mass member and operator to block axial movement of the operator and resist movement of the primary mass member from the predetermined axial position, the application of an acceleration pulse of predetermined amplitude and time to the primary mass member moving the primary mass member through a predetermined axial distance to release the wedgingly engageable means from both the primary mass member and operator and release the operator for axial movement relative to the guide, the application of lesser amplitude pulses moving the secondary mass member against the predetermined bias thereon independently of any movement of the primary mass member relative to the wedgingly engageable means, the secondary mass member impacting the primary mass member upon cessation of such lesser amplitude pulses to ensure return of the primary mass member to the predetermined axial position should any movement of the primary mass member relative to the wedgingly engageable means occur.

3. A unidirectional sensor comprising, in combination, a support, a generally axial guide mounted on the support, a pair of annular seismic mass members axially movable relative to the guide, means exerting a predetermined axial bias on the secondary mass member, cooperating stop means on the primary mass member and support engageable with each other under the bias to locate the weight members in engagement with each other and in a predetermined axial position with respect to the guide, an operator slidably supported on the guide for axial movement relative thereto, resilient means biasing the operator axially of the guide, a plurality of balls wedgingly engageable with axially and radially directed surfaces of the primary mass member and operator to block axial movement of the operator and resist movement of the primary mass member from the predetermined axial position, the application of an acceleration pulse of predetermined amplitude and time to the primary mass member moving the primary mass members through a predetermined axial distance to release the balls from both the primary mass member and operator surfaces and release the operator for axial movement relative to the guide, the application of lesser amplitude pulses moving the secondary mass member against the predetermined bias thereon independently of any movement of the primary mass member relative to the balls, the secondary mass member impacting the primary mass member upon cessation of such lesser amplitude pulses to ensure return of the primary mass member to the predetermined axial position should any movement of the primary mass member relative to the balls occur.

4. A unidirectional sensor comprising, in combination, a support, a generally tubular linear guide having a plurality of circumferentially spaced radial apertures therethrough, primary and secondary annular seismic mass members surrounding the guide, means on each mass member slidably engaging the guide, means exerting a predetermined bias on the secondary mass member, cooperating stop means on the primary mass member and support engageable with each other under the bias to locate the weight members in engagement with each other and in a predetermined axial position with respect to the guide, the primary mass member including an annular tapered wall of predetermined axial extent overlying the guide apertures, an operator slidably mounted within the guide and having a radially extending annular shoulder, resilient means biasing the operator axially within the guide, a plurality of balls, each respective to an aperture of the guide and freely received therein, the balls being engageable with the mass member tapered wall to locate the balls within the guide and in engagement with the operator shoulder to block axial movement of the operator, the primary mass member being movable through a predetermined axial distance upon the application of an acceleration pulse of predetermined amplitude and time thereto to move the wall thereof out of engagement with the balls, the balls being forced radially inwardly of the operator shoulder against the force of the resilient means as the primary mass member wall moves axially and out of engagement with the balls, the operator shoulder thereupon moving the balls outwardly of the guide apertures and out of engagement therewith, the application of lesser amplitude pulses moving the secondary mass member against the predetermined bias thereon independently of any movement of the primary mass member, the secondary mass member impacting the primary mass member upon cessation of such lesser amplitude pulses to ensure return of the primary mass member to the predetermined axial position.